(12) United States Patent
Takaoka et al.

(10) Patent No.: US 7,216,263 B2
(45) Date of Patent: May 8, 2007

(54) PERFORMANCE MONITORING AND NOTIFICATION IN A THRESHOLD SENSITIVE STORAGE MANAGEMENT SYSTEM

(75) Inventors: Nobumitsu Takaoka, Tokyo (JP); Yasunori Kaneda, Tokyo (JP); Masayuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/591,038

(22) Filed: Oct. 31, 2006

(65) Prior Publication Data

US 2007/0050684 A1 Mar. 1, 2007

Related U.S. Application Data

(63) Continuation of application No. 10/816,552, filed on Mar. 31, 2004.

(30) Foreign Application Priority Data

Dec. 17, 2003 (JP) .............................. 2003-419425

(51) Int. Cl.
*G06F 11/00* (2006.01)
(52) U.S. Cl. ........................ 714/47; 709/224
(58) Field of Classification Search .................... 714/47
See application file for complete search history.

(56) References Cited

U.S. PATENT DOCUMENTS

| 7,010,660 | B2* | 3/2006 | Mimatsu et al. | ............. | 711/170 |
| 7,047,360 | B2* | 5/2006 | Soejima et al. | ............. | 711/114 |
| 7,096,315 | B2* | 8/2006 | Takeda et al. | ............... | 711/111 |
| 2003/0135609 | A1* | 7/2003 | Carlson et al. | ............. | 709/224 |
| 2005/0021591 | A1* | 1/2005 | Boyd et al. | ................. | 709/200 |
| 2005/0177685 | A1* | 8/2005 | Soejima et al. | ............. | 711/114 |
| 2006/0173992 | A1* | 8/2006 | Weber et al. | ............... | 709/224 |

\* cited by examiner

*Primary Examiner*—Scott Baderman
*Assistant Examiner*—Paul Contino
(74) *Attorney, Agent, or Firm*—Townsend and Townsend and Crew LLP

(57) ABSTRACT

A method for monitoring according to a hint when allocating a storage volume. When a threshold value violation has occurred, judgement is performed from which use purpose the threshold value derives. The management computer for managing a computer system includes a unit for creating a storage volume according to a hint, a unit for deciding a threshold value for managing the storage volume according to the use purpose of the storage volume, a unit for acquiring a performance value from the storage apparatus, and a unit for comparing the acquired performance value to the threshold value and notifying a warning including a message based on the hint when a threshold value violation is detected.

13 Claims, 11 Drawing Sheets

230

| REDUNDANT GROUP NUMBER | RAID LEVEL | HARD DISK ID |
|---|---|---|
| 0 | 5 | 0 |
| 1 | 1 | 4 |
| 2 | 5 | 8 |
| 3 | 1 | 20 |
| 4 | 5 | 24 |

231

| LOGICAL VOLUME NUMBER | REDUNDANT GROUP NUMBER | START NUMBER | END NUMBER |
|---|---|---|---|
| 260 | 0 | 0 | 99 |
| 261 | 0 | 100 | 199 |
| 262 | 0 | 200 | 299 |
| 263 | 1 | 0 | 199 |
| 264 | 1 | 200 | 299 |

| STORAGE ID | LOGICAL VOLUME NUMBER | REDUNDANT GROUP NUMBER | R/W | I/O SIZE | TRANS | BAND |
|---|---|---|---|---|---|---|
| 1.0.0.0 | 260 | 0 | 3 | 64 | 1 | 0 |
| 1.0.0.0 | 261 | 0 | 3 | 64 | 1 | 0 |
| 1.0.0.0 | 262 | 0 | 2 | 256 | 7 | 7 |
| 1.0.0.0 | 263 | 1 | 6 | 32 | 5 | 3 |
| 1.0.0.0 | 264 | 1 | 6 | 32 | 5 | 3 |

| | | | | |
|---|---|---|---|---|
| STORAGE ID | LOGICAL VOLUME NUMBER | AVERAGE PROCESSING WAIT TIME | DATA TRANSFER AMOUNT | AVERAGE DATA TRANSFER AMOUNT PER PROCESSING WAIT TIME |
| 1.0.0.0 | 260 | 0 | 1 | 1 |
| 1.0.0.0 | 261 | 0 | 1 | 1 |
| 1.0.0.0 | 262 | 100 | 20 | 20 |
| 1.0.0.0 | 263 | 300 | 5 | 5 |
| 1.0.0.0 | 264 | 300 | 5 | 5 |

| TIME STAMP | READ AVERAGE I/O SIZE | READ AVERAGE DATA TRANSFER AMOUNT | READ AVERAGE PROCESSING WAIT TIME | READ IOPS | WRITE AVERAGE I/O SIZE | WRITE AVERAGE DATA TRANSFER AMOUNT | WRITE AVERAGE PROCESSING WAIT TIME | WRITE IOPS |
|---|---|---|---|---|---|---|---|---|
| 2003/6/30 17:00 | 64 | 1280 | 0.05 | 20 | 64 | 320 | 0.02 | 5 |
| 2003/6/30 17:15 | 64 | 256 | 0.08 | 4 | 64 | 128 | 0.02 | 2 |
| 2003/6/30 17:30 | 64 | 640 | 0.08 | 10 | 64 | 192 | 0.02 | 3 |
| 2003/6/30 17:45 | 64 | 204 | 0.2 | 3 | 64 | 640 | 0.02 | 10 |

161

PERFORMANCE MONITORING AND NOTIFICATION IN A THRESHOLD SENSITIVE STORAGE MANAGEMENT SYSTEM

BACKGROUND OF THE INVENTION

The present invention relates to a computer system management program for managing a computer system including a computer and a storage apparatus, a recording medium, a computer system, a management apparatus and a storage apparatus thereof, and in particular to a technique for setting a monitoring unit of a computer system by utilizing a hint used in operation of allocating a storage area in a storage apparatus and upon notifying a warning in the monitoring unit, creating an additional message of warning according to the hint and notifying it together with the warning.

Among monitoring systems monitoring a computer system, there is one utilizing a threshold value. The monitoring system acquires from respective apparatuses constituting a computer system, a numerical value (mainly, a performance value) indicating the state of the apparatuses and compares the value with a predetermined threshold value. If the former exceeds (is greater than or smaller than) the threshold value, a warning is generated.

When using this kind of monitoring system, there is a problem that it is difficult to select an appropriate threshold value. To cope with this, JP-A-2002-215230 discloses a method for easily setting an optimal threshold value. This method is as follows. Firstly, a user (administrator of the computer system) specifies the target number of threshold value violations of the numerical value indicating the state of the apparatuses to be managed for the monitoring system. Next, the monitoring system automatically adjusts the threshold value so that the number of threshold value violations of the numerical value indicating the state of the apparatuses to be managed is identical to the specified target threshold value violation number.

Nowadays, together with monitoring of the computer system, a large-scale storage apparatus such as a disk array apparatus, especially a storage region provided by a large-scale storage apparatus has become an important item to be managed. As a main component of the computer system, a storage area network is now widely used. This storage area network uses a fibre channel (FC) for connecting the computer to the storage apparatus in a network type format, thereby flexibly connecting a computer to a storage apparatus. Thus, for example, it is possible to perform data backup without using LAN (local area network), thereby enabling a new application.

Moreover, as a network connecting a computer to a storage apparatus, some techniques using IP (Internet Protocol) network attract attention and are widely spread. Under such a condition, an enterprise organization SNIA (Storage Networking Industry Association) has been organized by enterprises concerning storage network.

SNIA is promoting spread of the storage network through the activity of formulation of the standard specification of the storage network and peripheral technique. For example, SNIA suggests a standard specification for operation of allocating a storage area in a computer in the computer system including the storage apparatus. This specification is applied to management software managing a computer system. Moreover, this specification is based on CIM (Common Information Model) defined by DMTF (Distributed Management Task Force).

In the operation of this standard storage area allocation, a parameter indicating the storage area feature is defined. When allocating a storage area, an administrator creates this parameter for the user purpose of the storage area and inputs it to the management software, thereby creating a desired storage area. This parameter is called "hint".

A portion associated with the hints is extracted below from the document defining the specification (Device 27_StorageServices. mof (lines 662 to 721) [online], Nov. 12, 2002, Distributed Management Task Force, [searched on Jan. 18, 2003], Internet <URL:http://www.dmtf.org/standards/cim_schema_v27.php>.

```
=====================================================
// StorageSettingWithHints
//
=====================================================
[Experimental, Version ("2.7.1"), Description (
    "This subclass of Storage Setting allows a
client to specify"
    "'hint's for optimization of the volume
performance. The effect"
    "of these hints is implementation
dependent.")]
class CIM_StorageSettingWithHints: CIM_StorageSetting{
    [MinValue (0), MaxValue (10), Description (
    "This hint is an indication from a client of
the importance"
    "placed on data availability. Values are 0 =
Don't Care to"
    "10 = Very Important.")]
    uint 16 DataAvailabilityHint;
    [MinValue (0), MaxValue (10), Description (
    "This hint is an indication from a client of
the randomness"
    "of accesses. Values are 0 = Entirely
Sequential to"
    "10 = Entirely Random.")]
    uint 16 AccessRandomnessHint;
    [MinValue (0), MaxValue (10), Description (
    "This hint is an indication from a client of
the direction"
    "of accesses. Values are 0 = Entirely Read
to"
    "10 = Entirely Write.")]
    uint 16 AccessDirectionHint;
    [Description (
    "This hint is an indication from a client of
the optimal"
    "access sizes. Several sizes can be
specified."),
        Units ("MegaBytes")]
    uint 16 AccessSizeHint #;
    [MinValue (0), MaxValue (10), Description (
    "This hint is an indication from a client how
important"
    "access latency is. Values are 0 = Don't
Care to"
    "10 = Very important.")]
    uint 16 AccessLatencyHint;
    [MinValue (0), MaxValue (10), Description (
    "This hint is an indication from a client of
bandwidth"
    "prioritization. Values are 0 = Don't Care
to"
    "10 = Very important.")]
    uint 16 AccessBandwidthWeight;
    [MinValue (0), MaxValue (10), Description (
    "This hint is an indication of the importance
the client"
    "places on the cost of storage. Values are 0
= Don't Care to"
    "10 = Very important. A Storage Volume
provider might choose"
    "to place data on low cost or high cost
drives based on"
    "this parameter.")]
```

-continued

```
    uint 16 StorageCostHint;
    [MinValue (0), MaxValue (10), Description (
      "This hint is an indication of the importance
placed on"
      "storage efficiency by the client. Values
are 0 = Don't Care"
      "to 10 = Very important. A Storage Volume
provider might choose"
      "different RAID levels based on this hint.")]
    uint 16 StorageEfficiencyHint;
};
```

The management software mounting CIM should handle the hints in mounting operation of the storage volume allocation.

SUMMARY OF THE INVENTION

In management of a computer system including a storage apparatus, it is necessary to configure monitoring based on a hint when a storage volume is allocated. When applying JP-A-2002-215230 to this, it is difficult to set a target number of the threshold value violations from the hint. Conventionally, there has not been a method for monitoring according to the storage volume hint.

Moreover, in the conventional monitoring system, it has been impossible to judge from which hint a threshold value violation derives when one has occurred and a system administrator has had difficulty to study a countermeasure to be taken for the threshold value violation.

It is therefore an object of the present invention to provide a technique for managing a computer system including a storage apparatus, the technique monitoring the computer system by using a hint in the storage volume allocation.

According to another aspect of the present invention, there is provided a technique for simultaneously notifying a warning explanation including the cause of the warning in the monitoring of the computer system.

In order to achieve the object of the present invention, a management computer managing the computer system includes: a unit for creating a storage volume according to a parameter indicating a characteristic of the storage volume; a unit for deciding a threshold value for managing the storage volume according to the parameter; a unit for acquiring a performance value from the storage apparatus; and a unit for comparing the acquired performance value to the threshold value and detecting a threshold value violation.

Moreover, the management computer for managing the computer system includes a unit for notifying a warning when the threshold value violation is detected.

Moreover, the management computer for managing the computer system includes a unit for adding a message to the warning according to the parameter.

Moreover, the message suggests use of a unit for improving the performance of the storage apparatus. The management computer for managing the computer system has the warning notification unit which contains a unit for including in the message a suggestion of use of the unit for improving the performance of the storage apparatus.

According to the present invention, it is possible to monitor the computer system appropriately for the use purpose according to the parameter derived from the use purpose of the storage region when allocating a storage volume, i.e., according to the hint.

Moreover, from the monitoring system of the computer system, it is possible to rapidly grasp from which hint the notified warning apparatuses when a threshold value violation has occurred. Accordingly, a system administrator can rapidly examine a countermeasure to be taken for the threshold value violation.

The other features of the present invention will be made clear in the detailed description below and the attached drawings.

BRIEF DESCRIPTION OF THE DRAWINGS

FIG. 5 explains allocation management information in the first embodiment.

FIG. 7 explains threshold value information in the first embodiment.

FIG. 9 explains performance information in the first embodiment.

DESCRIPTION OF THE EMBODIMENTS

Description will now be directed to embodiments of the present invention with reference to the attached drawings.

Figure 1:
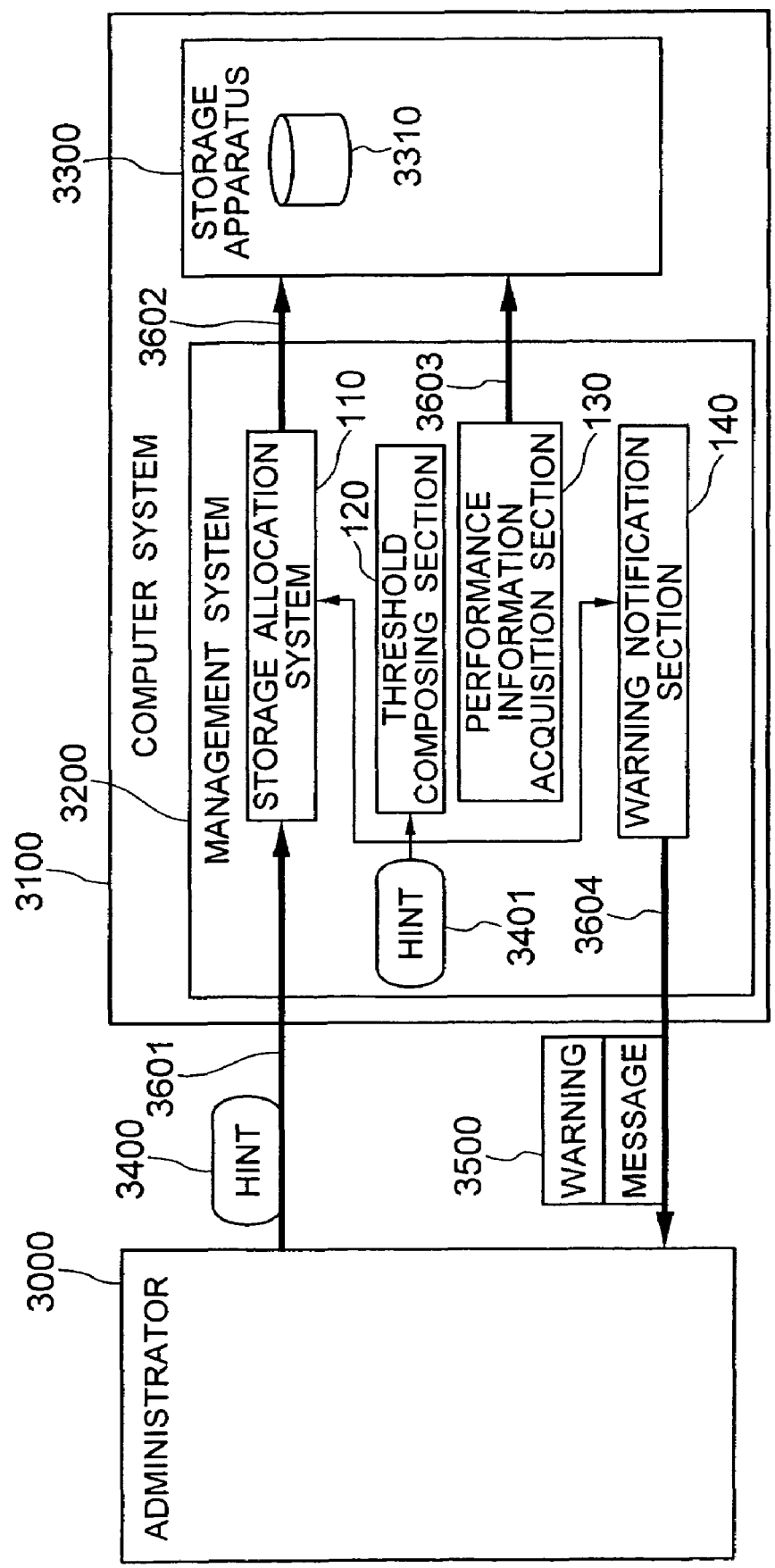
FIG. 1 shows an outline of an embodiment.

Firstly, referring to FIG. 1, explanation will be given on the outline of the embodiment of the present invention. FIG. 1 is a diagram for explaining three processes: storage volume allocation by an administrator, monitoring setting by the management system, and monitoring and warning notification by the management system.

Explanation will be given on each component constituting FIG. 1. An administrator 3000 is a person who manages the computer system 3100. The management system 3200 is a part of the computer system 3100 having management unit for managing the computer system 3100. The management system 3200 as the management unit, includes at least a storage allocation section 110, a threshold composing section 120, a performance information acquisition section 130, and a warning notification section 140. The computer system 3100 includes at least a storage apparatus 3300. A storage volume 3310 is a storage volume created in the storage apparatus 3300 by the storage allocation section 110.

Hereinafter, explanation will be given on each of the aforementioned three processes. In the process of storage volume allocation operation, the administrator instructs the storage allocation section 110 to perform allocation of a storage volume (arrow 3601). Here, the parameter (hint 3400) indicating the characteristic of the storage volume is notified to the storage allocation section 110. The storage allocation section 110 creates a preferable storage volume 3310 in the storage apparatus 330 according to the hint (arrow 3602). The hint 3400 is stored in the management system 3200 (hint 3401). As will be detailed later, the hint 3401 is referenced by the threshold composing section 120 and the warning notification section 140.

In the monitoring setting process by the management system, the threshold composing section 120 sets a threshold value for the performance information of the storage volume 3310 according to the hint 3401. Here, the relationship between the hint 3401 and the threshold value is also recorded.

In the monitoring and warning notification process by the management system, firstly, the performance information acquisition section 130 acquires performance information from the storage apparatus 3300 (arrow 3603). Next, the warning notification section 140 compares the acquired performance information to the aforementioned threshold value. If the performance information exceeds (greater than or smaller than) the threshold value, warning is issued to the administrator 3000 (arrow 3604). Here, the warning notification section 140 analyzes how the threshold value is related to the hint and notifies the threshold value violation to the administrator as well as notifies a message based on the hint.

It should be noted that in FIG. 1, the storage allocation section 110, the threshold composing section 120, the performance information acquisition section 130, and the warning notification section 140 are depicted outside the storage apparatus but a part or all of them may be arranged inside the storage apparatus 3300.

[First Embodiment]

Figure 2:
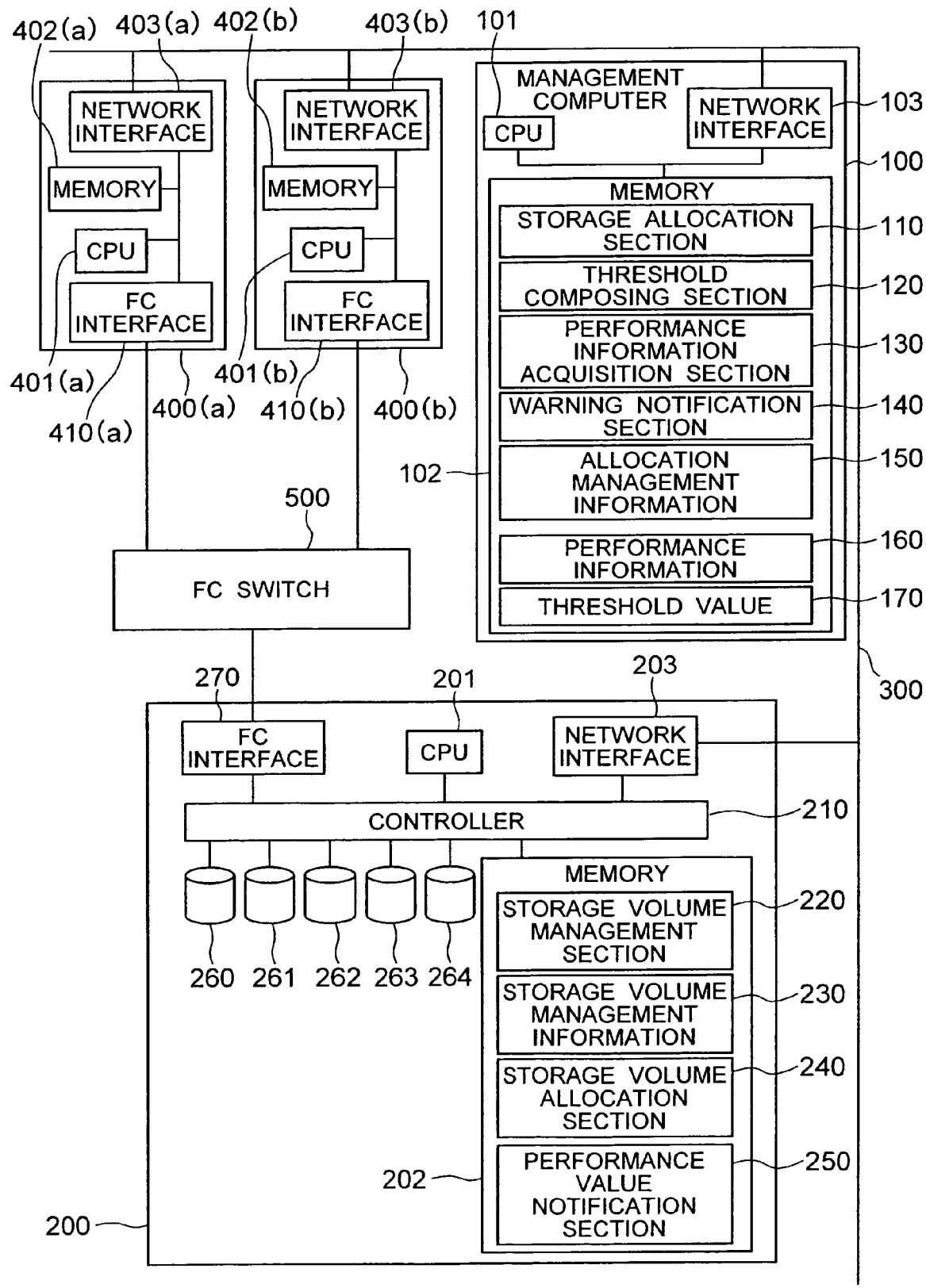
FIG. 2 shows configuration of a computer system according to a first embodiment.

Hereinafter, explanation will be given on the first embodiment of the present invention. FIG. 2 shows configuration of the computer system according to the first embodiment of the present invention. As shown in FIG. 2, the first embodiment of the present invention includes a management computer 100, a storage apparatus 200, an LAN 300, computers 400(a) and 400(b), and an FC switch 500.

The management computer 100 is an ordinary computer including a CPU 101, a memory 102, a network interface 103, a display device, a hard disk, a keyboard, a mouse, and the like and capable of operating software including various operating systems. In this embodiment, the management computer 100 is a personal computer. It may also be a computer for workstation and a server or a general-purpose computer. It should be noted that in FIG. 2, other than the CPU 101, the memory 102, and the network interface 103 are omitted.

The management computer 100 includes a storage allocation section 110, a threshold composing section 120, performance information acquisition section 130, and a warning notification section 140. The components 110 to 140 are programs executable by the management computer 100. That is, the components 110 to 140 are stored in the memory 102 or the hard disk of the management computer 100 and interpreted/executed by the CPU 101 of the management computer 100. Thus, the management computer 100 functions as a computer system management apparatus for managing the computer system including the storage apparatus 200.

Moreover, the management computer has allocation management information 150, performance information 160, and threshold value information 170. Each of the information 150 to 170 is stored in the memory 102 of the management computer 100 or the hard disk and information read, addition, correction, and deletion are performed by the program executed on the management computer 100.

The storage apparatus 200 includes a CPU 201, a memory 202, a network interface 203, a controller 210 a storage volume management section 220, storage volume management information 230, a storage volume allocation section 240, a performance value notification section 250, logical volumes 260 to 264, and an FC interface 270. Each of the logical volumes 260 to 264 can be accessed from the computer as a read/write-enabled storage region (equivalent to a logical unit in SCSI). The read/write access to the logical volumes by the computer is realized by data communication via the FC interface 270. This data communication uses the SCSI (Small Computer System Interface) protocol.

It should be noted the computers 400(a) and 400(b) can communicate with the storage apparatus 200 by using their FC interfaces 410(a) and 410(b), respectively. By this, the computers 400(a) and 400(b) request the storage apparatus 200 to read/write to/from the logical volumes 260 to 264. The storage apparatus 200 receives the read/write request from the computers 400(a) and 400(b) via the FC interface 270. The computers 400(a) and 400(b) and the interfaces of the storage apparatus 200 are connected via an FC switch 500.

The controller 210 processes the read/write request to the logical volumes 260 to 264 from the computer 400(a) and 400(b). According to the request, the controller 210 performs data transfer to the computer 400(a) and 400(b) or data storage into the logical volumes. Moreover, the controller 210 drives the storage volume management section 220, the storage volume allocation section 240, and the performance notification section 250. In this embodiment, the controller 210 includes a CPU 201 and a memory 202 and has capability to interpret/execute a program. The sections 220, 240, and 250 are programs stored in the memory 202 and executed by the controller 210. It should be noted that the present invention can also be implemented by using a storage apparatus in which the functions equivalent to the sections 220, 240, and 250 are mounted by the dedicated hardware.

The storage storage apparatus 200 uses a plurality of hard disks in combination to obtain the so-called RAID function improving the reliability and performance. The logical volumes 260 to 264 use the RAID function to divide the storage volumes of the hard disks of the storage apparatus 200 and concatenate them. In FIG. 2, the hard disks of the storage apparatus 200 are not depicted.

The storage volume management section 220 is a section for managing such logical volumes. The storage volume management information 230 is information for managing the allocation state of the logical volumes. The storage volume management information 230 is stored in the memory region of the controller 210. The storage volume management information 230 is used by the storage volume management section 220, the storage volume allocation section 240, the controller 210, and the performance notification section 250. The storage volume management information will be detailed later.

The storage volume allocation section 240 provides a function to constitute a new logical volume in the storage apparatus 200. An external computer performs data communication with the storage apparatus 200 via LAN 300, thereby instructing creation of a new logical volume. The controller 210 receives such an instruction and drives the storage volume allocation section 240 to create the instructed logical volume.

The performance notification section 250 notifies the performance values of the logical volume of the storage apparatus 200 and the FC interface via the LAN 300 to the external computer. In this embodiment, the storage apparatus 200 outputs at least (1) average I/O size of write requests to the logical volume (in kilobyte), (2) average data transfer rate of the write requests to the logical volume per second (in kilobyte), (3) average processing wait time of write requests to the logical volume (in second), (4) average number of write requests to the logical volume per second, (5) average I/O size of read requests to the logical volume (in kilobyte), (6) average data transfer amount of read requests to the logical volume per second (in kilobyte), (7) average processing wait time of the read requests to the logical volume (in second), and (8) performance value of the average number of read requests to the logical volume.

Here, the average processing wait time in (3) and (6) is an average value of time from the moment when the controller receives the read/write processing to the moment when transmission of all the data requested is complete. This time includes wait time in data transfer to the hard disk or from the hard disk.

The computers 400(*a*) and 400(*b*) are ordinary computers including a CPU 4001(*a*) and 401(*b*), memories 402(*a*) and 402(*b*), network interfaces 403(*a*) and 403(*b*), display devices, hard disk devices, keyboards, mouses, and the like and can operate software including an operating system. In FIG. 2, the components other than the CPU, memories and network interfaces are omitted.

In this embodiment, the computers 400(*a*) and 400(*b*) are used to operate software relating to enterprise activities such as a database server and a Web server. The main purpose of use of the logical volume of the storage apparatus 200 by the computers 400(*a*) and 400(*b*) is to store data required by these software.

In this embodiment, the read/write request by the computers 400(*a*) and 400(*b*) is communicated only via the FC interface 410(*a*) and 410(*b*). This embodiment of the present invention can also be realized by using LAN 300 for the read/write request. On the contrary, this embodiment of the present invention can also be realized by using the FC interface for the management data communication of the storage apparatus 200 (logical volume creation, performance value output). It should be noted that in this embodiment, the two computers 400(*a*) and 400(*b*) are used for job purpose. However, the number of computers is not limited to this according to the present invention.

Next, explanation will be given on the logical volume and hard disk of the storage apparatus 200 and a redundant group. Here, the redundant group is defined as a set of a plurality of hard disks including redundant data for data protection in a storage sub-system having the RAID function such as the storage apparatus 200. According to the storage sub-system, the redundant group is called a RAID group, parity group, or the like.

As a combination of hard disks in the redundant group, there is known a concept of the RAID level. The redundant group of the storage apparatus 200 is at either RAID level 1 or RAID level 5. Moreover, the redundant group of the storage apparatus 200 consists of four hard disks.

Terms concerning the redundant group are defined below:

Hard disk number: Numbers 0 to 3 assigned to hard disks belonging to the redundant group.

Hard disk ID: Numbers, different from the hard disk number, starting from 0 uniquely assigned to the hard disks in the entire storage apparatus 200.

Logical block address (LBA): Numbers starting from 0 assigned to each logical block consisting of 512 bytes of the storage region of the hard disk.

Striping unit: Hard disks belonging to a redundant group divided into a predetermined continuous number of logical blocks. Striping unit number is assigned to the striping unit in the order of LBA.

Stripe: Striping units of each hard disk belonging to a redundant group and having identical striping unit number. The striping units are concatenated in the ascending order of the hard disk number and assumed to be a continuous single region.

Redundant group number: Unique identification number in the storage apparatus assigned to the redundant group.

In the case of the redundant group composed as the RAID level 5, on one of the striping units belonging to the stripe, parity data calculated from the other three stripes is recorded. In this embodiment, the parity data is arranged by employing the method called left-symmetric parity distribution.

In the case of the redundant group composed as the RAID level 1, on the striping units (of the even numbers of the striping unit) having the hard disk number 0 and 2, the same information is recorded while on the striping unit (of the odd numbers of the striping unit) having the hard disk number 1 and 3 the same information is recorded. Moreover, the striping units of the even numbers and the striping units of the odd numbers are handled alternately as a continuous storage region. The logical volumes 260 to 264 are composed of some continuous stripes. Such configuration of the logical volume is recorded in the storage region management information 230 in the storage apparatus 200.

Explanation will be given on the storage region management information 230 with reference to FIG. 3. The storage region management information 230 includes two types of information: redundant group management information 230 and the logical volume management information 232. The redundant group management information 231 uses a table format such as a relation database as the data format. Each line of it has one-to-one correspondence with the redundant group arranged in the storage apparatus 200 and has a field for storing information constituting the redundant group. It should be noted that the fields in the table are called a first field, a second field, . . . starting from the leftmost of the figure.

The first field of the redundant group management information 231 stores the redundant group number where the logical volume corresponding to the line is composed. Moreover, the second field stores the RAID level of the redundant group specified by the redundant group number stored in the first field.

Moreover, the third field stores a hard disk ID of the first hard disk among the hard disks constituting the redundant group specified by the redundant group number stored in the first group.

In this embodiment, the redundant group of the storage apparatus 200 is composed of four hard disks of continuous hard disk ID. Accordingly, the redundant group management information 231 does not contain a field for storing the number of hard disks constituting the redundant group.

The logical volume management information 232 also uses a table format as the data format like the redundant group management information 231. Each line of it has one-to-one correspondence with the logical volume arranged in the storage apparatus 200 and has a field for storing configuration information on the logical volume.

The first field of the logical volume management information 232 stores the logical volume number. The second field stores the redundant group number of the redundant group containing the logical volume specified by the first field. The third field indicates the striping unit number indicating the stripe of the redundant group indicated by the second field from which the logical volume indicated by the first field is started. The fourth field indicates the striping unit number indicating the last stripe among the stripes constituting the logical volume indicated by the first field.

Explanation will be given on the correspondence between the configuration information stored in the logical volume information 232 and actual logical volume configuration with reference to FIG. 4. FIG. 4 shows configuration of the logical volume in the redundant group of the redundant group number 0.

Figures 3, 4:
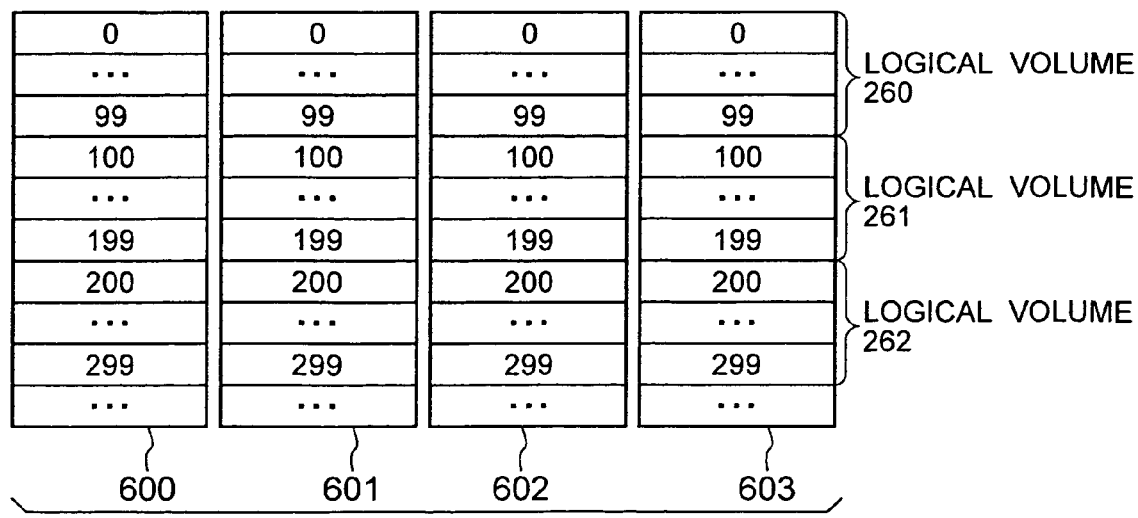
FIG. 3 explains storage volume management information in the first embodiment.
FIG. 4 shows a redundant group and a logical volume.

In FIG. 4, reference numerals 600 to 603 respectively indicate the four shelf-shaped rectangular blocks. Each of the shelf-shaped rectangular blocks represent a hard disk contained in the redundant group of the redundant group number 0. Each shelf of the rectangular blocks represent a striping unit of the hard disk. The numerals inside the shelves represent the striping unit numbers. The three dots " . . ." in a shelf indicate that a plurality of continuous striping units are present.

According to the logical volume information 232 of FIG. 3, the logical volume of the logical volume number 260 is composed of stripes of striping units numbers 0 to 99. That is, the logical volume of the logical volume number 260 is composed, in FIG. 4, by using the striping units of numbers 0 to 99 in the hard disks 600 to 603.

Similarly, the logical volume of the logical volume number 261 is composed of stripes 100 to 199, and the logical volume of logical volume number 262 is composed of stripes 200 to 299. The management computer 100 can acquire the redundant group management information 231 and the logical volume management information 232 from the storage apparatus 200 via LAN 300.

The storage volume allocation section 240 provides a unit for creating a new logical volume in the redundant group. These units can be controlled from the management computer 100 via LAN 300. When creating a logical volume by using the storage volume allocation section 240, the redundant group number and the logical volume size are specified as parameters.

Here, brief explanation will be given on the storage volume allocation section 240 although it is not essential for this invention. When the storage volume allocation section 240 receives the redundant group number and the logical volume size, it firstly checks the redundant group management table 231. From this, the hard disk allocated to the redundant group is specified.

Next, the storage volume allocation section 240 checks the logical volume management table 232. From this, the specified redundant group checks the stripes used. Stripe are allocated for the new volume not to overlap with these stripes already used. An amount of stripes to be allocated are calculated from the specified size. When the stripes to be allocated to the logical volume are decided as has been described above, the storage volume allocation section 240 adds information on the configuration of a new logical volume created as a new line to the logical volume management information 232.

Hereinafter, explanation will be given on the processing in the management computer. The storage allocation section 110 of the management computer 100 provides a unit for creating a logical volume inside the storage apparatus according to the hint which is a parameter showing a characteristic of the storage volume. When a user performs volume allocation, the user gives at least a desired logical volume size and the hint as parameters to the storage allocation section 110. Then, the storage allocation section 110 creates a logical volume inside the storage apparatus according to the hint.

The hint can specify the following:

Read/write ratio: A value from 0 to 10. The ratio indicates which of read requests and write requests are greater in the read/write requests for the logical volume. When 0 is specified, it is considered that only read requests are present. When 10 is specified, it is considered that only write requests are present. This ratio may be called DataDirectdionHint below.

Average I/O size: An average data transfer amount in the reqd/write requests. In kilo byte unit. This size may be referred to as AccessSizeHint below.

I/O wait time importance: A value from 0 to 10. As this value increases, the I/O wait time becomes important. This may be referred to as AccessLatencyHint.

Data transfer band width importance: A value from 0 to 10. As this value increases the data transfer band width becomes important. This may be referred to as AccessBandwidthWeight below.

Here, as the parameter to the storage allocation section 110, a computer capable of allocating a logical volume may be specified. In this case, the storage allocation section 110 creates a logical volume in the storage apparatus and sets the storage apparatus and the computer so that the logical volume can be read/write accessed from the specified computer.

The management computer 100 provides a user interface (not depicted) for user to input information for executing storage volume allocation by the storage allocation section 110. This user interface is provided by the graphical user interface and command line interface. This embodiment provides a user interface which can be operated by using a display, a keyboard, and a mouse of the management computer 100 for executing the storage allocation section 110 by specifying the logical volume size and allocation hint. Moreover, it is possible to provide a user interface capable of executing the storage allocation section 110 from a computer other than the management computer 100.

The hint specified by the user when the logical volume is allocated by the user interface is recorded in the allocation management information 150. An example of allocation management information is shown in FIG. 5. As shown in FIG. 5, the allocation management information data format is a table format. Each line of it corresponds to a logical volume. In this explanation, a logical volume corresponding to the line will be called an object logical volume.

The first field of each line stores an identifier for uniquely identifying the storage apparatus of the object logical volume. This identifier will be called a storage ID. Here, as the storage ID an IP address for controlling the storage apparatus is used. In all the lines of FIG. 5, the first field is filled with "1.0.0.0". In this specification, this represents an IP address in connection of the storage apparatus 200 to LAN 300. The storage ID in this first field is provided because it is required in correspondence to the computer system including a plurality of storage apparatuses.

The second field stores an identification number of the object logical volume in the storage apparatus specified by the first field. By the first field and the second field, the logical volume is uniquely identified in the entire information system. The third field stores the redundant group number. The fourth to the seventh field store the hint specified when the object logical volume is allocated. The fourth field (R/W) stores the read/write ratio. The fifth field (I/O size) stores the I/O size. The sixth field (Trans) stores the I/O wait time importance. The seventh field (Band) stores the bandwidth importance.

Figure 6:
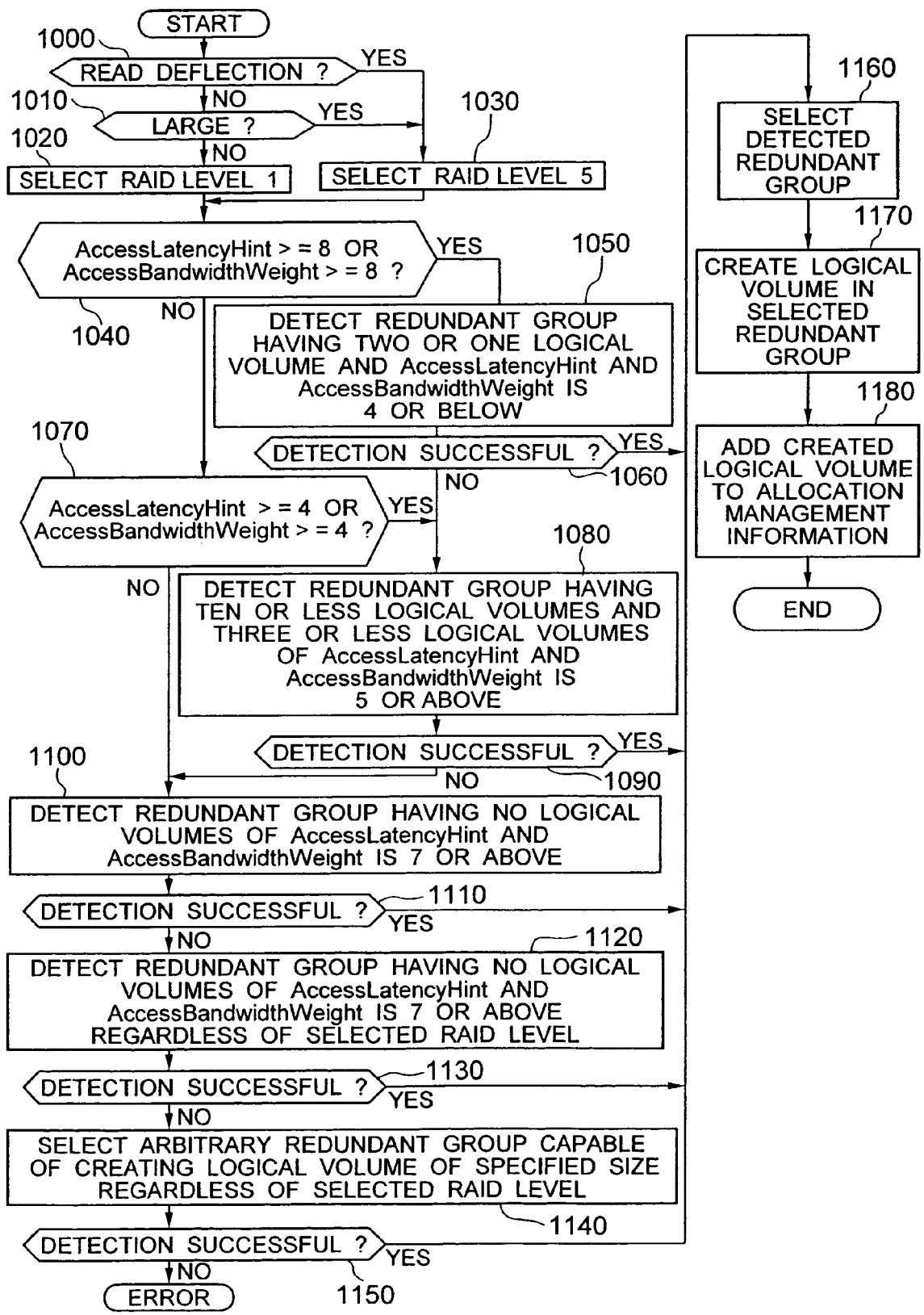
FIG. 6 explains flow of logical volume allocation processing in the first embodiment.

FIG. 6 shows a processing flow in the storage allocation section 110. The processing shown in FIG. 6 uses the size of the logical volume allocated and the hint as the input parameters. These parameters are specified by the user via the aforementioned user interface.

In steps 1000 to 1030, the RAID level of the redundant group for creating a logical volume is selected. Firstly, in step 1000, it is checked whether the AccessDirectionHint (read/write ratio) of the specified hint is 4 or below. If so, it is considered that the access is oriented to read and the RAID level 5 is selected (step 1030). In step 1010, if the hint AccessSizeHint (average I/O size) is 256 kilobytes or above, the access is considered to be large. The large access means that the data transfer amount required in one access is 256 kilobytes or above. It should be noted that not large access is a small access. If the access is large, the RAID level 5 is selected. Otherwise, the RAID level 1 is selected.

In steps 1040 to 1160, the redundant group for creating a logical volume is selected. In this step, the RAID level which has been selected in the preceding step, the values of hints AccessLatencyHint (I/O wait time importance) and AccessBandwidthWeight (data transfer bandwidth importance) are referenced. Step 1040 checks whether the AccessLatencyHint or AccessBandwidthWeight is 0 or above. If these values are 8 or above, it is considered that high access performance is required and control is passed to step 1050. Otherwise, control is passed to the condition judgment of step 1070.

In step 1050, a redundant group satisfying the following conditions is detected according to the allocation management information 150 and the storage volume management information 230 acquired from the storage apparatus 200.
Condition 1: RAID level selected in step 1020 or 1030.
Condition 2: Can create a logical volume of specified size.
Condition 3: Two or one logical volume is included in the redundant group.
Condition 4: For the logical volumes contained in the redundant group, the hint AccessLatencyHint (I/O wait time importance) related to the logical volumes is 4 or below and the AccessBandwidthWeight (data transfer bandwidth importance) is 4 or below.

When such a redundant group is detected, control is passed to step 1160. Otherwise, control is passed to step 1080.

Step 1070 checks whether the AccessLatencyHint (I/O wait time importance) or AccessBandwidthWeight (data transfer bandwidth importance) is 4 or above. If these values are 4 or above, control is passed to step 1080. Otherwise, control is passed to step 1100.

In step 1080, a redundant group satisfying the following conditions is detected according to the allocation management information 150 and the storage volume management information 230 acquired from the storage apparatus 200.
Condition 1: RAID level selected in step 1020 or 1030.
Condition 2: Can create a logical volume of specified size.
Condition 3: Ten or less logical volumes are included in the redundant group.
Condition 4: For the logical volumes contained in the redundant group, the hint AccessLatencyHint (I/O wait time importance) or the AccessBandwidthWeight (data transfer bandwidth importance) is 3 or below.

When such a redundant group is detected, control is passed to step 1160. Otherwise, control is passed to step 1100. In step 1100, a redundant group satisfying the following conditions is detected according to the allocation management information 150 and the storage volume management information 230 acquired from the storage apparatus 200.
Condition 1: RAID level selected in step 1020 or 1030.
Condition 2: Can create a logical volume of specified size.
Condition 3: There exists no logical volumes contained in the redundant group having the hint of AccessLatencyHint (I/O wait time importance) or the AccessBandwidthWeight (data transfer bandwidth importance) which is 7 or above.

When such a redundant group is detected, control is passed to step 1160. Otherwise, control is passed to step 1120. In step 1120, a redundant group satisfying the following conditions is detected according to the allocation management information 150 and the storage volume management information 230 acquired from the storage apparatus 200.
Condition 1: Can create a logical volume of specified size.
Condition 2: There exists no logical volumes contained in the redundant group having the hint of AccessLatencyHint (I/O wait time importance) or the AccessBandwidthWeight (data transfer bandwidth importance) which is 7 or above.

When such a redundant group is detected, control is passed to step 1160. Otherwise, control is passed to step 1140. In step 1140, redundant groups which can create a logical volume of the specified size are selected at random. If no such redundant group exists, an error is caused. In step 1160, the redundant group detected is selected as a redundant group for allocating the logical volume.

In step 1170, the selected redundant group and the logical volume size are specified for the storage apparatus 200 and creation of the logical volume is instructed. Thus, a new logical volume is created by the aforementioned storage volume allocation section 240. In step 1180, the configuration information on the logical volume created in step 1170 is added to the allocation management information 150. Here, the information recorded are storage ID, the logical volume number, the redundant group number, and the hint.

It should be noted that the algorithm of the logical volume allocation processing explained up to step 1170 is only an example. The present invention can be realized by using an algorithm other than this algorithm.

The method for logical volume allocation based on the hint has been explained.

In this embodiment, monitoring of the logical volume is performed by using the hint used in volume allocation. The monitoring of the logical volume is performed basically by comparing the various performance values of the logical volume to threshold values. The threshold values are stored in the threshold value information 170.

FIG. 7 explains the contents of the threshold value information 170. As shown in FIG. 7, the data format of the threshold value information 170 is a table format. Each line of the threshold value information 170 corresponds to the logical volume of the threshold value management object. Each line consists of five fields.

Hereinafter, a logical volume corresponding to each volume will be referred to as a corresponding logical volume. The first field stores the storage ID of the corresponding logical volume. The second field stores the logical volume number of the corresponding logical volume. The third field stores a threshold value of the average wait time for the corresponding logical volume. The fourth field stores a threshold value of the average data transfer amount for the corresponding logical volume. The fifth field stores a threshold value of the average data transfer amount per wait time for the corresponding logical volume. This value is a threshold value of the value decided by the following equation:

(average data transfer amount per second)/{(average processing wait time)*(average number of requests per second)}

In the threshold value information 170, the value 0 means that no value is decided. That is, the item whose value is 0 is not monitored. Setting of the threshold value is performed by the threshold composing section 120. In this embodiment, the monitoring object is a performance value of the logical volume.

Figure 8:
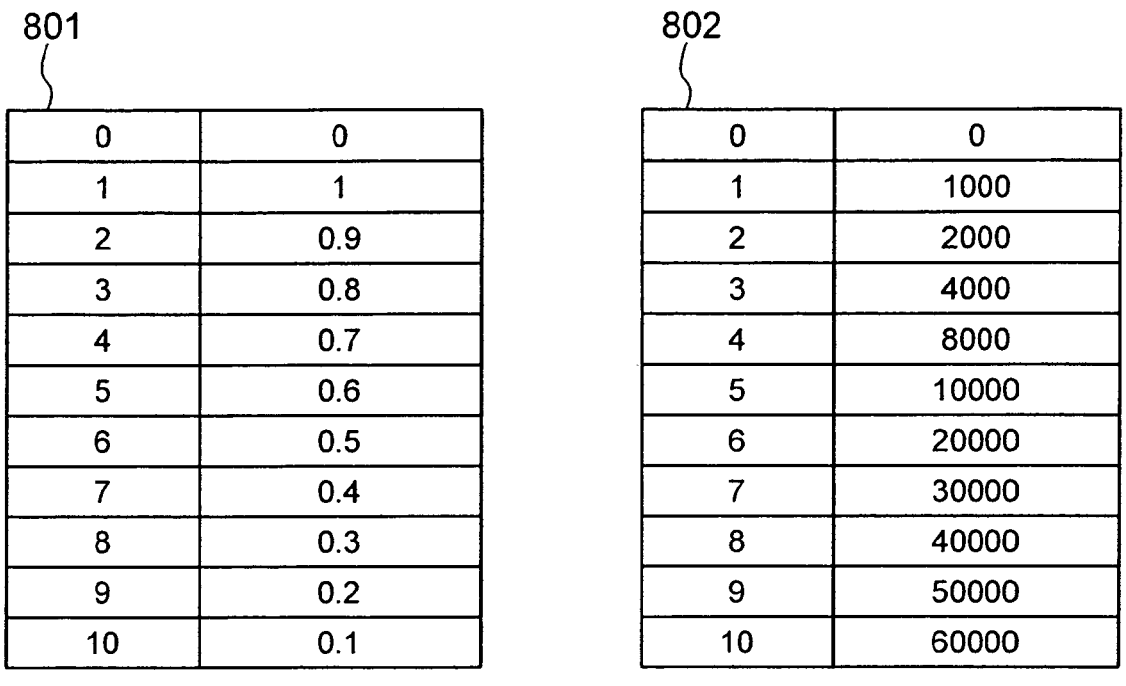
FIG. 8 explains a table for deciding a threshold value in the first embodiment.

The processing in the threshold composing section is executed when the logical volume is allocated. The parameters input for this processing are the storage ID of the logical volume, the logical volume number, and the hint. The threshold composing section 120 decides a threshold value according to the information indicating the relationship between the hint and the threshold value. In this embodiment, for example, the threshold composing section 120 decides a threshold value according to two tables shown in FIG. 8.

Table 801 shows correspondence between the value of the AccessLatencyHint (I/O wait time importance) of the hint and the logical volume average access wait time threshold value. The first field of each line shows the value of the AccessLatencyHint. The second field shows a threshold value of the average access wait time of the logical volume corresponding to the AccessLatencyHint value shown in the first field. Table 802 shows correspondence between the value of the AccessBandwidthWeight (data transfer bandwidth importance) and the threshold value of the average data transfer amount per the logical volume wait time. The first field of each line shows the value of the AccessBandwidthWeight. The second field shows a threshold value of the average data transfer amount per logical volume wait time. It should be noted that in tables 801 and 802, the threshold value 0 means that the threshold value is not monitored.

The threshold composing section 120 decides the monitoring threshold value of the logical volume for storing the information on the relationship between the hints and the threshold values according to the tables 801 and 802 in the threshold value information 170. Here, in this embodiment, the monitoring threshold values are automatically decided by the management computer 100. However, it is also possible to prompt a user to correct or acknowledge a threshold value by using the aforementioned user interface before deciding the threshold value.

The performance information 160 stores a performance value acquired from the storage apparatus 200. FIG. 9 explains information stored in the performance information 160. Especially performance information 161 of the logical volume 260 is detailed. As shown in FIG. 9, the performance information of the logical volume 260 is in a table format having 9 fields. Each line corresponds to a time when the performance information concerning the logical volume 260 is acquired. The first field stores the time when the performance information is acquired. The second field stores the average I/O size of read access. The third field stores the average data transfer amount per read access unit time. Here, the unit time is second. The fourth field stores the average processing wait time of read access. The fifth field stores the average number of read accesses per unit time. Here, the unit time is second. The sixth field stores the average I/O size of write access. The seventh field stores the average data transfer amount of write access per unit time. Here, the unit time is second. The eighth field stores write access average processing wait time. The ninth field stores the number of average write accesses per unit time. Here, the unit time is second.

The performance information of the logical volumes 261 to 264 are also stored in the performance information 160 like the logical volume 260. The data format of the performance information of the logical volumes 261 to 264 is identical to the data format of the performance information 161 of the logical volume 260.

Figure 10:
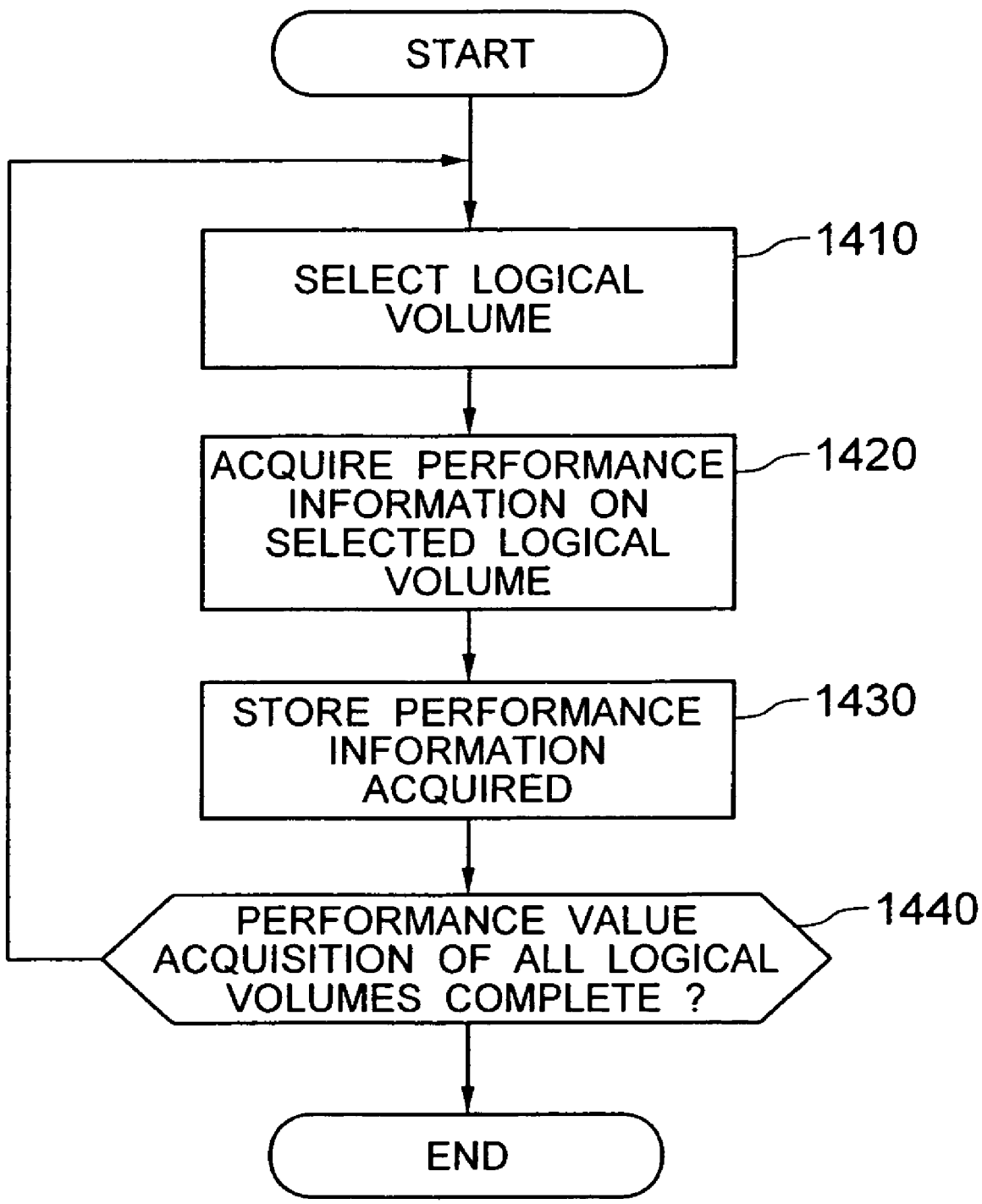
FIG. 10 explains flow of performance information acquisition processing in the first embodiment.

The performance information acquisition section 130 periodically acquires the performance information of the logical volumes 260 to 264 from the storage apparatus 200 and adds it to the performance information 160. Moreover, at the timing when the performance information is acquired from the storage apparatus 200, the performance information acquired is compared to the threshold value set in the threshold value information 170. The processing flow in the performance information acquisition section 130 is shown in the flowchart of FIG. 10. Explanation will be given on the performance acquisition section 130 with reference to FIG. 10.

Steps 1410 to 1440 constitute a loop structure. This loop processing is executed for the logical volume to be monitored. Step 1410 selects a logical volume for which performance information is to be acquired. Here, the logical volume specified by the first field and the second field of each line of the threshold value information 170 is successively selected from the first line of the threshold value information 170 (from the uppermost line in the figure).

In step 1420, the performance information on the logical volume selected in step 1410 is acquired. The performance information acquired here are values corresponding to the respective fields of the logical volume performance information. That is, the average I/O size of read access, the average data transfer amount per unit time of the read access, the average processing wait time of read access, the average number of read accesses per unit time, the average I/O size of write access, the average data transfer amount per unit time of write access, the average processing wait time of write access, and the average number of write accesses per unit time.

In order to acquire these values, the performance information acquisition section 130 request the storage apparatus indicated by the first field of the threshold value information 170 t output performance information. In the storage apparatus 200, the performance information acquisition request executed in step 1420 of the performance information acquisition section 130 is processed by the performance value notification section 250.

In step 1430, the performance information acquired in step 1420 is added to the performance information 160. Here, the time when the performance information is acquired is stored as the first field. In step 1440, if the performance information acquisition processing of all the logical volumes contained in the threshold value information 170 is not complete, the processing from step 1410 is performed to the next logical volume.

Next, explanation will be given on the monitoring using a hints and a threshold value. As has been described in the background art, the management system of the computer system notifies a warning to a user when the various monitoring numeric value items of the device to be monitored violates a predetermined threshold value. In this invention, when the warning is notified to the user, a message concerning the hint is also notified. This operation is realized by the warning notification section 140.

Figure 11:
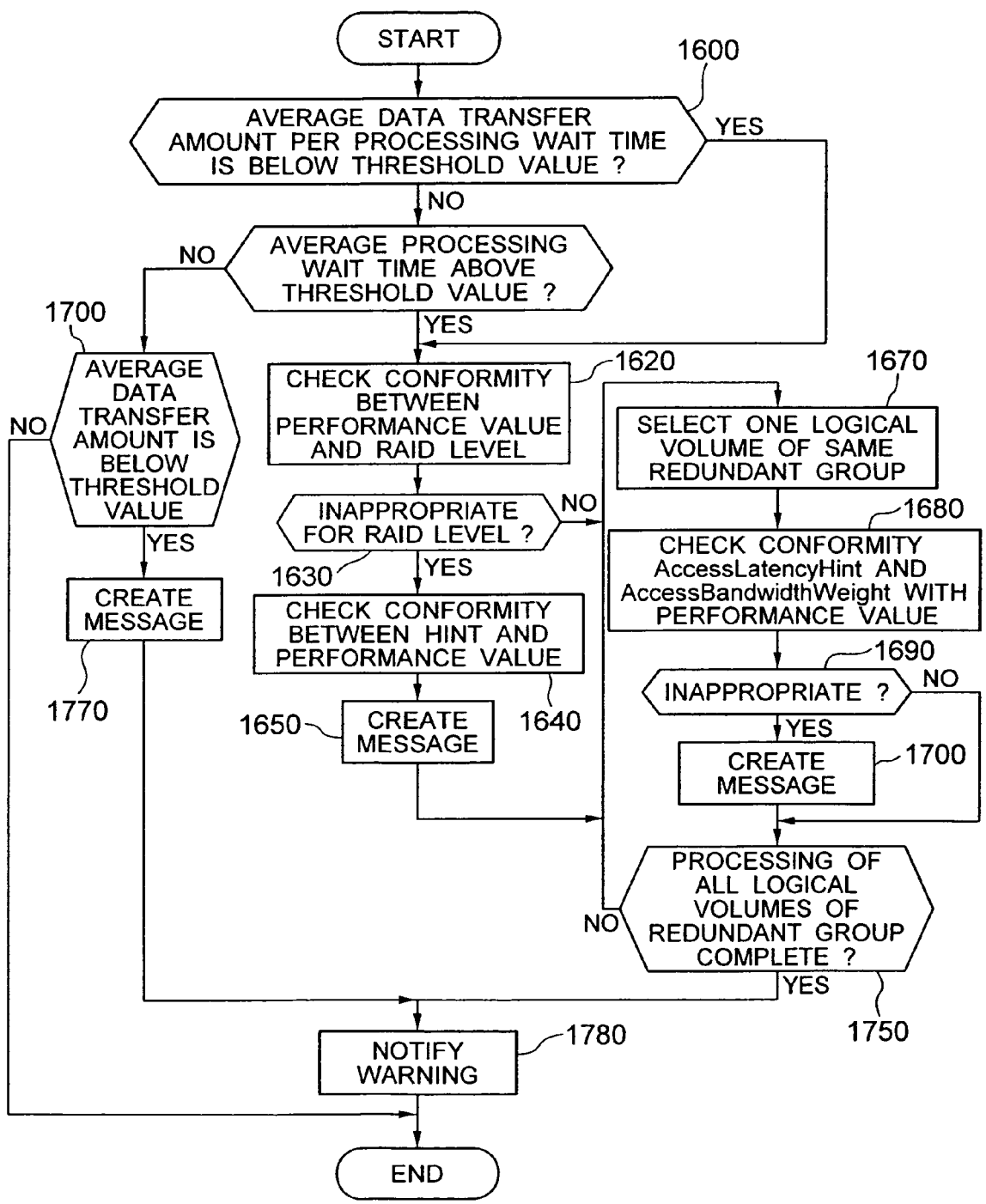
FIG. 11 explains flow of warning notification processing in the first embodiment.

FIG. 11 is a flowchart showing a processing flow in the warning notification section 140. The processing shown in FIG. 11 is executed after the performance information collection processing of the logical volume is executed in the performance information acquisition section 130. The processing shown in FIG. 11 is for a single logical volume. The processing shown in FIG. 11 is executed for all the logical volumes specified by the first and the second field of the threshold value information 170. The input parameters of the processing shown in FIG. 11 are a logical volume number and a storage ID of the apparatus providing the logical volume. In the explanation below, the logical volume specified by the input parameter will be referred to as an object logical volume. In the processing shown in FIG. 11, the performance information used for inspection is the latest acquired by the performance information acquisition section 130.

In step 1600, it is checked whether the average data transfer amount per processing wait time of the read and write request is below a threshold value. The threshold value used is the average data transfer amount threshold value per processing wait time of the object logical volume. Here, the value of the inspection object used is based on the latest performance information on the object logical volume stored in the performance information 160. For each of read and write, the average data transfer amount is divided by the average processing wait time to obtain a quotient, which is used. That is, two values of read and write are used as values of inspection objects.

The two values of inspection objects are compared to the aforementioned threshold value. If one of them is lower than the threshold value, it is assumed that a performance problem has occurred and control is passed to step 1620. Otherwise, control is passed to step 1610. In step 1610, it is checked whether the average processing wait time of read and write request for the object logical volume is above a threshold value. The threshold value used here is an average processing wait time threshold value stored in the threshold value information 170 and corresponding to the object logical volume.

The value of the inspection object used here is the latest performance information on the object logical volume stored in the performance information 160, i.e., the average processing time for each of read and write. That is, two values of read and write are used as values of inspection objects. The two values of inspection objects are compared to the aforementioned threshold value. If one of them exceeds the threshold value, it is assumed that a performance problem has occurred and control is passed to step 1620. Otherwise, control is passed to step 1770.

Step 1620 checks whether the characteristics of actual access to the object logical volume (read/write ratio and I/O size) are appropriate for the RAID level of the redundant group to which the object logical volume belongs. Hereinafter, the RAID level of the redundant group of the object logical volume will be referred to simply as the RAID level of the object logical volume.

When the RAID level of the object logical volume is 1, the characteristic of the access to the object logical volume is assumed to be appropriate for the RAID level if both of the following conditions are satisfied:
Condition 1: Average write I/O size is 256 kilobytes or below.
Condition 2: Average read IOPS is smaller than the average write multiplied by 1.5.

When the RAID level of the object logical volume is 5, the characteristic of the access to the object logical volume is assumed to be appropriate for the RAID level if one of the conditions 1 or 2 or both of them are not satisfied. If the characteristic of the access to the object logical volume is judged to be appropriate for the RAID level, control is passed to step 1680. Otherwise, control is passed to step 1640. It should be noted that the aforementioned conditions 1 and 2 are equivalent to the conditions for selecting the RAID level in the logical volume allocation.

In step 1640, conformity between the allocation hint and the actual access characteristic of the object logical volume is checked. In this step, if one of the following conditions is satisfied, it is judged that the actual access characteristic is not appropriate for the allocation hint of the object logical volume.

Condition 1: The average write I/O size as the latest performance information on the object logical volume stored in the performance information 160 is 256 kilobytes or below and the I/O size of the allocation hint is 250 kilobytes or above.

Condition 2: The average write I/O size as the latest performance information on the object logical volume stored in the performance information 160 is 256 kilobytes or above and the I/O size of the allocation hint is 250 kilobytes or below.

Condition 3: The read IOPS as the latest performance information on the object logical volume stored in the performance information 160 is the write IOPS multiplied by 1.5 or below and the read/write ratio of the allocation hint is 6 or below.

Condition 4: The read IOPS as the latest performance information on the object logical volume stored in the performance information 160 is the write IOPS multiplied by 1.5 or above and the read/write ratio of the allocation hint is 6 or above.

In step 1650, a warning message is created to indicate the inconformity between the actual access characteristic for the object logical volume and the allocation hint of the object logical volume judged in step 1640. For Conditions 1 to 4, a messages created when the respective conditions are satisfies are as follows. It should be noted that the inconformity of the RAID level is generated.

1. When Condition 1 or 2 is satisfied, the message says that "the I/O size of access to the <<object logical volume>> does not coincide with the I/O size specified for the hint."

2. When Condition 3 or 4 is satisfied, the message says that "the read/write ratio to/from the <<object logical volume>> does not coincide with the read/write ratio specified for the hint."

3. When none of Conditions 1 to 4 is satisfied, the message says that "<<the object logical volume>> allocated is not a logical volume appropriate for the hint." The part <<object logical volume>> is replaced by a word representing the object logical volume.

After the message is created in step 1650, control is passed to step 1670. Steps 1670 to 1750 check the redundant group containing the object logical volume, i.e., the hint and actual access frequency of the logical volume other than the object logical volume contained in the redundant group.

Such a check is performed because of the following reasons. In this embodiment, the logical volume given a low value for the AccessLatencyHint (I/O wait time importance) and the AccessBandwidthWeight (data transfer bandwidth importance) in the hint during the allocation is assumed to have a low access frequency. Accordingly, for the redundant group containing such logical volumes, a logical volume having a high AccessLatencyHint and AccessBandwidthWeight may be allocated later.

Under such a condition, if the access to the logical volume whose access has been considered low increases, the logical volume requiring a high access frequency allocated later may be affected and its performance may be lowered. Although such performance lowering (threshold value violation) may be recognized, its cause may not be known.

Accordingly, for the threshold value violation by the object logical volume, notification of a logical volume which may possibly a cause to a user will help the user to study the performance improvement of the logical volume.

In step 1670, for the redundant group to which the object logical volume belongs, one logical volume (other than the object logical volume) belonging to the redundant group is selected. Selection of the logical volume can be performed by checking the logical volume management information 232. It should be noted that steps 1670 to 1750 constitute a loop structure but in step 1670, it is assumed that a logical volume which has been selected once will not be selected again. Hereinafter, the logical volume selected in step 1670 will be referred to as the selected logical volume.

Step 1680 makes a check for the selected logical volume, i.e., conformity between the AccessLatencyHint (I/O wait time importance) and AccessBandwidthWeight (data transfer bandwidth importance) which are hints during allocation and the performance value. Here, it is checked whether access to the selected logical volume is increased in spite of the low value of the AccessLatencyHint and AccessBandwidthWeight of the selected logical volume. If the selected logical volume is in such a state, control is passed from step 1690 to step 1700. Otherwise, control is passed to step 1750. As will be detailed later, the processing of step 1700 creates a message describing affect to the performance.

Firstly, AccessLatencyHint and AccessBandwidthWeight of the selected logical volume are acquired from the allocation management information 150. Next, the read IOPS and write IOPS are acquired from the performance information by the latest performance information of the selected logical volume. If the AccessLatencyHint and AccessBandwidthWeight is lass than 4 and the sum of the read IOPS and the write IOPS is greater than a predetermined value, the selected logical volume is assumed to be a logical volume affecting the performance of the object logical volume.

Step 1700 creates a message describing that the selected logical volume has an affect to the performance of the object logical volume. The message created here is as follows. "<<The selected logical volume>> is accessed with a high frequency unlike the specified hint". <<The selected logical volume>> is replaced by a word representing a selected logical volume.

Step 1750 is the end of the loop. This step checks whether all the logical volumes contained in the redundant group of the object logical volume have been subjected to the processing of steps 1670 to 1700. If there is a logical volume not processed, control is returned to step 1670. Here, the logical volumes belonging to the same redundant group interact their performances as has been described above. Such a phenomenon can also be seen depending on the RAID level.

A write access of a small I/O size (equal to the striping unit or below) to the redundant group of RAID level 5 gives a great affect to the performance of the entire redundant group. Accordingly, in the loop of steps 1670 to 1700, with respect to the selected logical volume, it is effective to check conformity between the RAID level and the performance value by the method described in steps 1620 to 1640 and create a message as has been described in step 1650.

The processing of step 1760 is executed when no threshold value violation is recognized in steps 1600 and 1610. Here, the target is to notify a user that the access frequency is actually low although a high performance is required of the object logical volume by the hint. Step 1760 checks whether the average data transfer amount of the object logical volume is lower than the threshold value.

The threshold value in this step is the data transfer amount threshold value of the object logical volume stored in the threshold value information 170. This step compares the sum of the average read data transfer amount and the average write data transfer amount of the object logical volume stored in the performance information 160 with the aforementioned threshold value. As a result, if the sum is lower than the threshold value, the object logical volume is assumed to be a logical volume which has an excessively high performance for the actual access. And in step 1770, a message is created. Otherwise, this series of processing is terminated.

Step 1770 creates a message as follows. "<<The object logical volume>> has an excessively high performance for the actual use." The part <<the object logical volume>> is replaced by a character string representing the object logical volume.

Step 1780 notifies a warning of threshold value violation to the user. When notifying the warning, the messages created in steps 1650, 1700, and 1770 are included. The warning is notified to the user via the aforementioned user interface. It is also possible to notify the user by using the log recording function such as syslog. Moreover, it is possible to use the message exchange function such as e-mail. Moreover, it is also possible to notify the warning to the user by using the protocol, for management such as SNMP.

Thus, the logical volume is monitored and if a threshold value violation is generated, an appropriate message is reported to the user.

[Second Embodiment]

Figure 12:
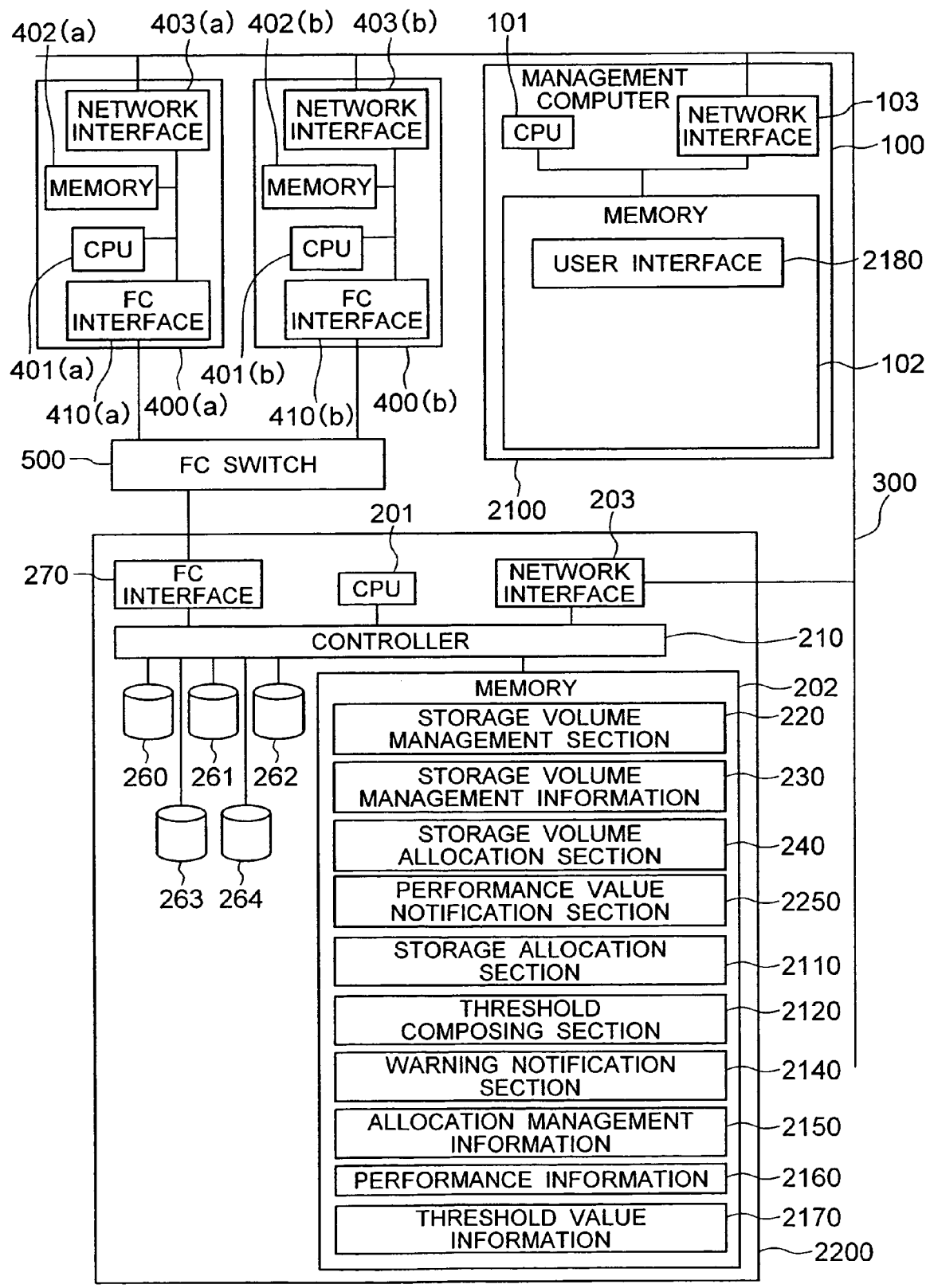
FIG. 12 shows the entire computer system according to a second embodiment.

Description will now be directed to a second embodiment of the present invention. FIG. 12 shows the second embodiment of the present invention. The sections and information equivalent to the storage allocation section 110, the threshold composing section 120, the warning notification section 140, the allocation management section 150, the performance information 160, and the threshold information which are contained in the management computer 100 (see FIG. 2) in the first embodiment are contained in the apparatus in the second embodiment. The storage apparatus 2200 is an extended device of the storage apparatus 200 (see FIG. 2) for containing these sections and information.

The storage apparatus 220 includes a storage allocation section 2110, a monitoring section 2120, a warning notification section 2140, allocation management information 2150, performance information 2160, and threshold information 2170. These sections and information are equivalent to the sections and information of the same names in the management computer 100 of the first embodiment which are operated in the storage apparatus 2200. In the second embodiment, the controller 210 includes a CPU 201 and a memory 202 and has an ability to interpret and execute a program. The sections 220, 240, 250, 2250, 2110, 2120, and 2140 are programs which are stored in the memory 202 and executed by the controller 210. It should be noted that the present invention can also be realized by using the storage apparatus having dedicated hardware for the functions equivalent to the sections 220, 240, 2250, 2110, 2120, and 2140.

In the second embodiment, the functions of the performance information acquisition section 130 and the performance value notification section 250 are realized by the performance value notification section 2250. That is, the performance value notification section 2250 accumulates information on the performance of the logical volumes 260 to 264 in the performance information 2160.

The management computer 2100 is an ordinary computer having a user interface 180. By using the user interface 2180, like the first embodiment, the user can control the storage allocation section 2110, the monitoring section 2120, and the warning notification section 2140 of the storage apparatus 2200. Moreover, the management computer 100 can also have the effect of the present invention in the second embodiment from the explanation of the first embodiment concerning the allocation management information 150, the performance information 160, and the threshold value information 170.

Thus, the two embodiments have been explained. Here, additional explanation will be given on the embodiments.

In the first and the second embodiment, the storage apparatus contained in the computer system is the storage apparatus 200 or 2200. However, the present invention can also be applied to a computer system containing a plurality of storage apparatuses. In the first and the second embodiment, only one FC switch is contained in the computer system. However, the essential quality of the present invention will not be changed by the number of the FC switches.

The first and the second embodiment can be extended in such a manner that the performance information can be acquired not only from the storage apparatus but also from the computer or the FC switch and threshold values can be set for them.

There is a storage apparatus which has a function to improve the performance inside the storage apparatus. For example, the aforementioned storage area network has a function for always containing the data stored in the logical volume in the cache memory (cache resident function). This dramatically improves the access performance to the logical volume. In the processing flow explained with reference to FIG. 11, a message is created in steps 1650 and 1700. In these steps, it is possible to create a message to suggest application of the aforementioned cache resident function for the logical volume.

Moreover, it is possible to calculate the size of the appropriate cache memory size for the logical volume and automatically apply the cache resident function. In this case, the message includes that the cache resident function is automatically applied.

Moreover, in addition to the cache resident function, the performance improvement function includes a logical volume movement function for moving data stored in a logical volume to another logical volume and a band control function for controlling the bandwidth used by the I/O request from a particular computer in the FC interface.

The present invention has been explained through the embodiments. However, the present invention is not to be limited to these embodiments but can be modified in various ways without departing from the spirit of the invention.

What is claimed is:

1. A management computer for managing a computer system which includes a data processor and a storage apparatus coupled to the data processor via a first network, the data processor and the storage apparatus being coupled to the management computer via a second network, the computer system further including a plurality of logical volumes allocated from the storage apparatus, each logical volume belonging to one of a plurality of redundant groups, the management computer comprising:

a storage allocation unit that allocates said logical volumes;

a performance information acquisition unit that periodically acquires, from said storage apparatus, latest performance values of each of the logical volumes, said latest performance values indicating states of said logical volumes;

a threshold composing unit that determines a threshold performance value corresponding to each logical volume and maintains a threshold information comprising threshold performance values of said logical volumes; and a warning unit that selects a logical volume, conducts a comparison of a latest performance value of said selected logical volume with its corresponding threshold performance value, and notifies a user with a warning message when its latest performance value deviates from its corresponding threshold performance value, wherein said storage allocation unit is operable to receive from said user a request to create a new logical volume, said request including a plurality of hint values specified according to said Common Information Model (CIM) as parameters indicating a feature of said new logical volume, said hint values being stored on a per logical volume basis as allocation management information, said storage allocation unit is further operable to conduct, based on said allocation management information, a first-step search that searches already created redundancy groups to detect a redundant group including already created logical volumes having first predetermined hint values lower than said requested hint values of said new logical volume, if said first-step search was successful in detecting a redundancy group, said storage allocation unit determines said redundancy group thus detected as a redundancy group to which said new logical volume is to belong, otherwise, said storage allocation unit conducts, based on said allocation management information, a second-step search that searches said already created redundancy groups to detect a redundant group including already created logical volumes having second predetermined hint values higher than said first predetermined hint values, and if said second-step search was successful in detecting a redundancy group, said storage allocation unit determines said redundancy group thus detected in said second-step search as a redundancy group to which said new logical volume is to belong; otherwise, said storage allocation unit selects an arbitrary redundant group to which said new logical volume is to belong.

2. The management computer according to claim 1, wherein said requested hint values include AccessLatencyHint and AccessBandwidth Weight specified in the CIM standard.

3. The management computer according to claim 2, wherein said latest performance values of each of said logical volumes are expressed as hint values obtained by using AccessLatencyHint and AccessBandwidthWeight values, based on a table comprising a correspondence relationship between said performance values and said hint values, said warning unit selects an already created logical volume of a redundancy group to which said new logical volume belongs, said warning unit conducts another comparison that compares a latest performance values expressed by using AccessLatencyHint and AccessBandwidthWeight values of said already created logical volume with its corresponding requested hint values, based on said table and said allocation management information, and if said another comparison indicates that said latest performance values of said selected logical volume are higher than said corresponding requested hint values thereof, said warning unit notifies said user of a warning message indicating that said selected logical volume may exert a bad influence on a logical volume of said redundancy group to which said selected logical volume belongs.

4. The management computer according to claim 1, wherein said first network is a storage area network (SAN) and another data processor is further provided, with said data processor and said another data processor being coupled to said storage apparatus via a Fibre Channel (FC) switch.

5. The management computer according to claim 1, wherein said second network is a local area network (LAN).

6. A management computer for managing a computer system which includes a data processor and a storage apparatus coupled to said data processor via a first network, said data processor and said storage apparatus being coupled to said management computer via a second network, said computer system further including a plurality of logical volumes each thereof belonging to one of a plurality of redundancy groups and being allocated in said storage apparatus, the management computer comprising:

a storage allocation unit that allocates logical volumes of data to be accessible by said data processor;

a performance information acquisition unit that periodically acquires, from said storage apparatus, latest performance values of each of said logical volumes, said latest performance values indicating a state of each of said logical volumes;

a threshold composing unit that determines threshold values of said performance values of each of said logical volumes, a correspondence relationship between said performance values and said threshold values being stored on a logical volume basis as threshold information; and a warning unit that selects a logical volume, conducts a comparison of a latest performance value of said logical volume thus selected with a corresponding threshold value based on said threshold information, and notifies a user with a warning message indicating that said logical volume thus selected is inappropriate with regard to said corresponding threshold value, if said comparison indicates that said latest performance value of said logical volume thus selected deviates from said corresponding threshold value, wherein said storage allocation unit receives from said user a request to create a new logical volume, said request including hint values obtained by using input/output (I/O) wait time and data transfer bandwidth values as performance values of said new logical volume, said requested hint values thus received being stored on a per logical volume basis as allocation management information, said storage allocation unit determines, based on said allocation management information, a redundancy group to which said new logical volume is to belong, said threshold composing unit expresses said latest performance values of each of said logical volumes by hint values obtained by using I/O wait time and data transfer bandwidth values, based on a table storing a correspondence relationship between said performance values and said hint values, said warning unit selects one already created logical volume of said redundancy group to which said new logical volume belongs, said warning unit conducts another comparison that compares said latest performance values expressed by said hint values of said logical volume thus selected with said corresponding requested hint values of said logical volume thus selected, based on said table and said allocation management information, and if said another comparison indicates that said latest performance values of said selected logical volume are higher than said corresponding requested hint values thereof, said warning unit notifies said user of a warning message indicating that said selected logical volume may exert a bad influence on a logical volume of said redundancy group to which said new logical volume belongs.

7. A method for managing a computer system which includes a data processor and a storage apparatus coupled to said data processor via a first network, with said data processor and said storage apparatus being coupled to a management computer via a second network, and a plurality of logical volumes each thereof belonging to one of a plurality of redundancy groups and being allocated in said storage apparatus, the method comprising:

allocating, by a storage allocation unit, logical volumes of data to be accessible by said data processor;

periodically acquiring, by a performance information acquisition unit, latest performance values, from said storage apparatus, of each of said logical volumes, said latest performance values indicating a state of each of said logical volumes; and determining, by a threshold composing unit, threshold values of said performance values of each of said logical volumes, a correspondence relationship between said performance values and said threshold values being stored on a logical volume basis as threshold information;

in a warning unit, selecting a logical volume, conducting a comparison of a latest performance value of said logical volume thus selected with a corresponding threshold value based on said threshold information, and notifying a user with a warning message indicating that said logical volume thus selected is inappropriate with regard to said corresponding threshold value, if said comparison indicates that said latest performance value of said logical volume thus selected deviates from said corresponding threshold value;

receiving from said user, by said storage allocation unit, a request to create a new logical volume, said request including a plurality of hint values specified by the Common Information Model (CIM) defined by the Distributed Management Task Force (DMTF) as parameters indicating a feature of said new logical volume, said requested hint values received from said user being stored on a logical volume basis as allocation management information;

conducting, by said storage allocation unit based on said allocation management information, a first-step search that searches already created redundancy groups to detect a redundant group including already created logical volumes having first predetermined hint values lower than said requested hint values of said new logical volume;

if said first-step search was successful in detecting a redundancy group, determining, by said storage allocation unit, said redundancy group thus detected as a redundancy group to which said new logical volume is to belong; otherwise, conducting, by said storage allocation unit based on said allocation management information, a second-step search that searches said already created redundancy groups to detect a redundant group including already created logical volumes having second predetermined hint values higher than said first predetermined hint values; and if said second-step search was successful in detecting a redundancy group, determining, by said storage allocation unit, said redundancy group thus detected in said second-step search as a redundancy group to which said new logical volume is to belong; otherwise, selecting, by said storage allocation unit, an arbitrary redundant group to which said new logical volume is to belong.

8. The method according to claim 7, wherein said requested hint values include AccessLatencyHint and AccessBandwidth Weight specified by CIM.

9. The method according to claim 8, wherein
said threshold composing unit expresses said latest performance values of each of said logical volumes by hint values obtained by using AccessLatencyHint and AccessBandwidth Weight values, based on a table storing a correspondence relationship between said performance values and said hint values, said method further comprising steps of:

selecting, by said warning unit, one already created logical volume of said redundancy group to which said new logical volume belongs, conducting, by said warning unit, another comparison that compares said latest performance values expressed by using AccessLatencyHint and AccessBandwidth Weight values of said logical volume thus selected with said corresponding requested hint values of said logical volume thus selected, based on said table and said allocation management information, and if said another comparison indicates that said latest performance values of said selected logical volume are higher than said corresponding requested hint values thereof, notifying, by said warning unit notifies, said user of a warning message indicating that said selected logical volume may exert a bad influence on a logical volume of said redundancy group to which said new logical volume belongs.

10. The method according to claim 7, wherein said first network is a storage area network (SAN) and another data processor is further provided, with said data processor and said another data processor being coupled to said storage apparatus via a Fibre Channel (FC) switch.

11. The method according to claim 7, wherein said second network is a local area network (LAN).

12. A method for managing a computer system which includes a data processor and a storage apparatus coupled to said data processor via a first network, with said data processor and said storage apparatus being coupled to a management computer via a second network, and a plurality of logical volumes each thereof belonging to one of a plurality of redundant groups and being allocated in said storage apparatus, the method comprising:

allocating, by a storage allocation unit, logical volumes of data to be accessible by said data processor;

periodically acquiring, by a performance information acquisition unit, latest performance values, from said storage apparatus, of each of said logical volumes, said latest performance values indicating a state of each of said logical volumes; and determining, by a threshold composing unit, threshold values of said performance values of each of said logical volumes, a correspondence relationship between said performance values and said threshold values being stored on a logical volume basis as threshold information;

in a warning unit, selecting a logical volume, conducting a comparison of a latest performance value of said logical volume thus selected with a corresponding threshold value based on said threshold information, and notifying a user of with a warning message indicating that said logical volume thus selected is inappropriate with regard to said corresponding threshold value, if said comparison indicates that said latest performance value of said logical volume thus selected deviates from said corresponding threshold value;

receiving, by said storage allocation unit, from said user a request to create a new logical volume, said request including hint values obtained by using I/O wait time and data transfer bandwidth values as performance values of said new logical volume, said requested hint values thus received being stored on a logical volume basis as allocation management information;

determining, by said storage allocation unit, based on said allocation management information, a redundancy group to which said new logical volume is to belong;

expressing, by said threshold composing unit, said latest performance values of each of said logical volumes by hint values obtained by using I/O wait time and data transfer bandwidth values, based on a table storing a correspondence relationship between said performance values and said hint values;

selecting, by said warning unit, one already created logical volume of said redundancy group to which said new logical volume belongs;

conducting, by said warning unit, another comparison that compares said latest performance values expressed by said hint values of said logical volume thus selected with said corresponding requested hint values of said logical volume thus selected, based on said table and said allocation management information, and if said another comparison indicates that said latest performance values of said selected logical volume are higher than said corresponding requested hint values thereof, notifying, by said warning unit, said user of a warning message indicating that said selected logical volume may exert a bad influence on a logical volume of said redundancy group to which said new logical volume belongs.

13. A computer readable storage medium having a computer program for a computer system which includes a data processor and a storage apparatus coupled to said data processor via a first network, with said data processor and said storage apparatus being coupled to a management computer via a second network, and a plurality of logical volumes each thereof belonging to one of a plurality of redundant groups and being allocated in said storage apparatus, wherein said management computer comprises:

a storage allocation unit that allocates logical volumes of data to be accessible by said data processor;

a performance information acquisition unit that periodically acquires, from said storage apparatus, latest performance values of each of said logical volumes, said latest performance values indicating a state of each of said logical volumes; and a threshold composing unit that determines threshold values of said performance values of each of said logical volumes, a correspondence relationship between said performance values and said threshold values being stored on a logical volume basis as threshold information; and a warning unit that selects a logical volume, conducts a comparison of a latest performance value of said logical volume thus selected with a corresponding threshold value based on said threshold information, and notifies a user with a warning message indicating that said logical volume thus selected is inappropriate with regard to said corresponding threshold value, if said comparison indicates that said latest performance value of said logical volume thus selected deviates from said corresponding threshold value, the computer program comprising:

codes for said storage allocation unit to receive, from said user, a request to create a new logical volume, said request including a plurality of hint values specified by Common Information Model (CIM) defined by Distributed Management Task Force (DMTF) as parameters indicating a feature of said new logical volume, said requested hint values received from said user being stored on a logical volume basis as allocation management information;

codes for said storage allocation unit to conduct, based on said allocation management information, a first-step search that searches already created redundancy groups to detect a redundant group including already created logical volumes having first predetermined hint values lower than said requested hint values of said new logical volume;

codes for said storage allocation unit, if said first-step search was successful in detecting a redundancy group, to determine said redundancy group thus detected as a redundancy group to which said new logical volume is to belong; otherwise, to conduct, based on said allocation management information, a second-step search that searches said already created redundancy groups to detect a redundant group including already created logical volumes having second predetermined hint values higher than said first predetermined hint values; and codes for said storage allocation unit, if said second-step search was successful in detecting a redundancy group, to determine said redundancy group thus detected in said second-step search as a redundancy group to which said new logical volume is to belong; otherwise, to select an arbitrary redundant group to which said new logical volume is to belong.

* * * * *